No. 856,154. PATENTED JUNE 4, 1907.
D. D. HUGHEY.
GLASS MOLD.
APPLICATION FILED MAR. 12, 1907.
2 SHEETS—SHEET 1.
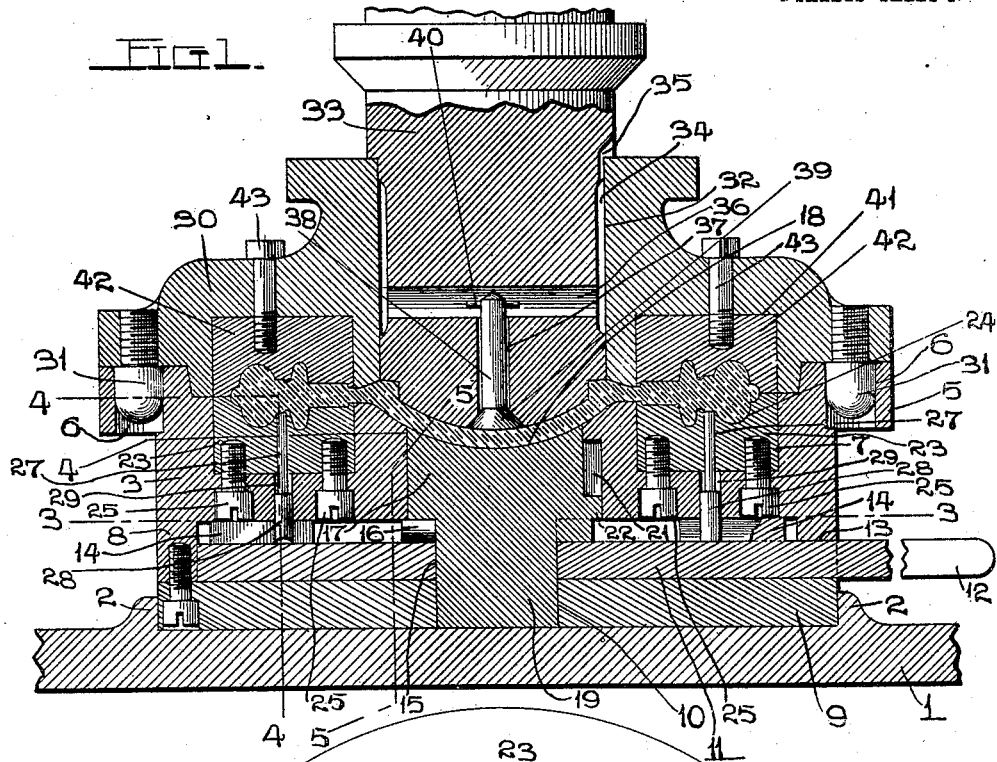
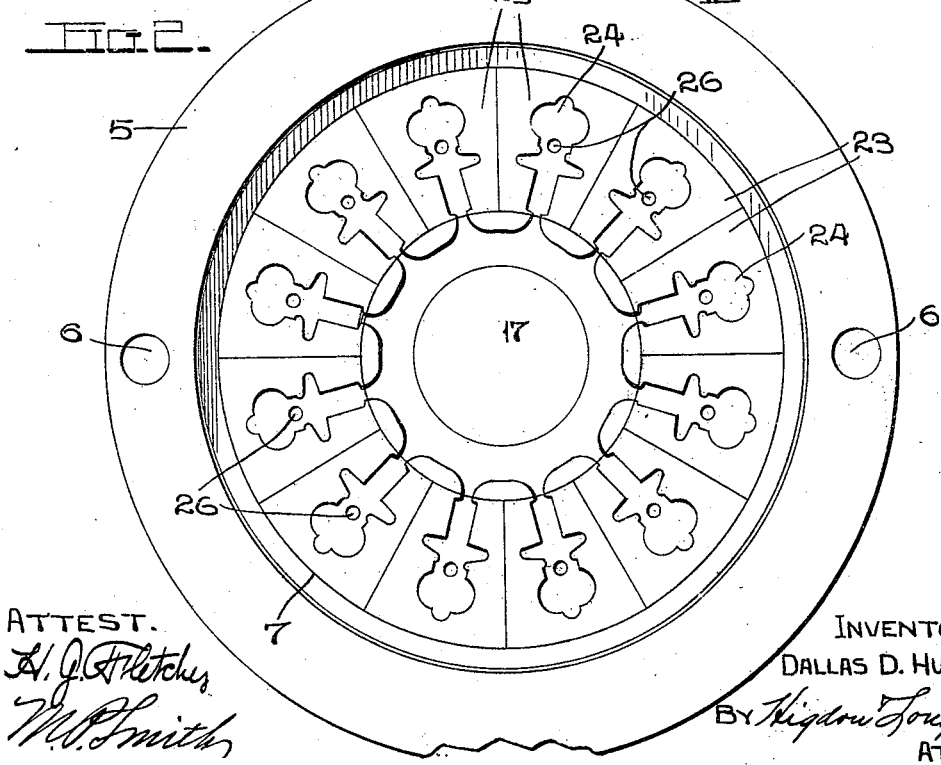
ATTEST.
INVENTOR.
DALLAS D. HUGHEY.
ATT'YS No. 856,154. PATENTED JUNE 4, 1907.
D. D. HUGHEY.
GLASS MOLD.
APPLICATION FILED MAR. 12, 1907.
2 SHEETS—SHEET 2.
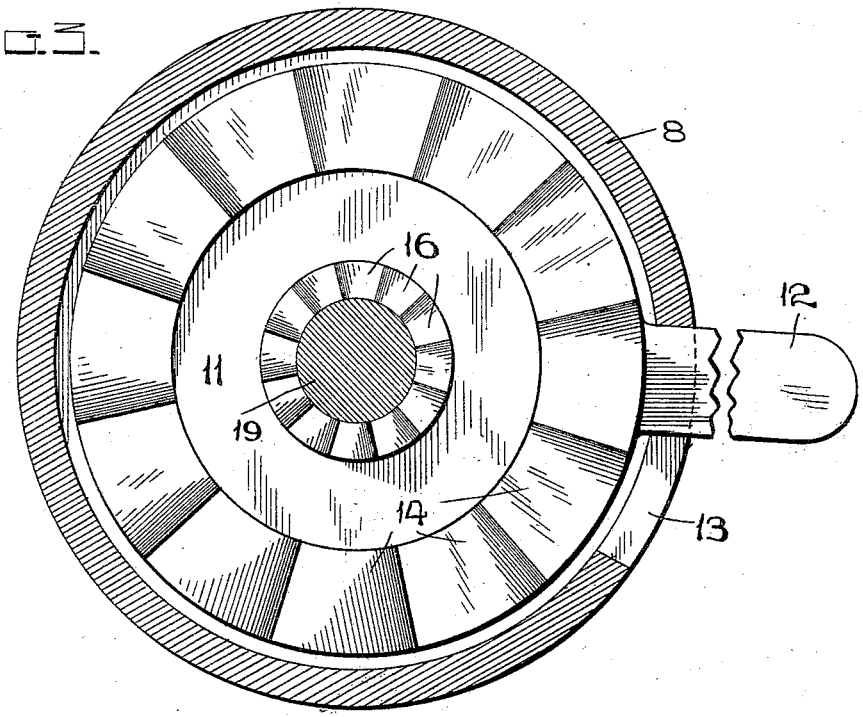
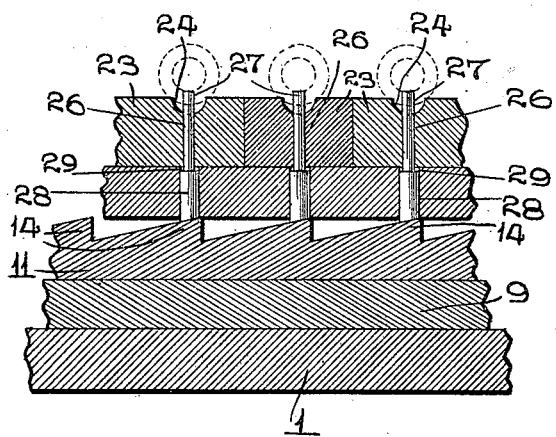
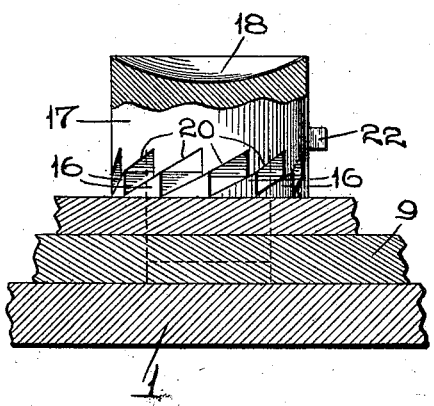
ATTEST.
H. J. Fletcher.
N. C. Smith.
INVENTOR.
DALLAS D. HUGHEY.
BY Higdon & Longan.
ATT'YS.

UNITED STATES PATENT OFFICE.

DALLAS D. HUGHEY, OF UPPER ALTON, ILLINOIS, ASSIGNOR TO ILLINOIS GLASS COMPANY, OF ALTON, ILLINOIS, A CORPORATION OF ILLINOIS.

GLASS-MOLD.

No. 856,154.      Specification of Letters Patent.      Patented June 4, 1907.

Application filed March 12, 1907. Serial No. 362,052.

*To all whom it may concern:*

Be it known that I, DALLAS D. HUGHEY, a citizen of the United States, and a resident of Upper Alton, Illinois, have invented certain new and useful Improvements in Glass-Molds, of which the following is a specification containing a full, clear, and exact description, reference being had to the accompanying drawings, forming a part hereof.

My invention relates generally to glass molds, and more particularly to a mold which receives molten glass which is pressed or forced into auxiliary molds to form small glass articles, such as bottle stoppers, and the like, and the object of my invention is to construct a simple, inexpensive mold which is easily operated, economical in its consumption of raw material, and the auxiliary molds or matrices of which are removable or interchangeable in order that a number of small articles of different form may be pressed or formed at the same time.

A further object of my invention is to so construct a glass mold as that the entire number of articles formed by one stroke of the mold are simultaneously elevated from the lower molds, in order that they may be readily engaged by a suitable tool and removed from the mold frame.

To the above purposes, my invention consists of certain novel features of construction and arrangement of parts, which will be hereinafter more fully set forth, pointed out in the claims, and illustrated in the accompanying drawings, in which:—

Figure 1 is a vertical section taken through the center of a mold of my improved construction; Fig. 2 is a plan view of the lower portion of the mold, and showing the lower or auxiliary molds therein; Fig. 3 is a horizontal section taken on the line 3—3 of Fig. 1; Fig. 4 is a detail section taken on the line 4—4 of Fig. 1; Fig. 5 is a detail section taken on the line 5—5 of Fig. 1.

Referring by numerals to the accompanying drawings:—1 designates a base in the form of a table, on which is formed a pair of guide ribs 2, thus forming a way in which the lower portion of the mold moves.

The lower mold frame comprises a block 3, in the center of which is formed a circular aperture 4, and integral with the top edge of said block is a flange 5, provided with a series of vertically disposed apertures 6. Formed in the top of the block 3, and concentric with the opening 4, is an annular depression 7, which receives the lower auxiliary molds; and formed integral with the lower edge of the block 3 is a flange 8, to which is bolted a disk 9, which is arranged to slide upon the table 1 between the guide ribs 2, and in the center of which is formed a circular aperture 10. Located on the disk 9, within the flange 8, is a rotary disk 11, which is provided on one edge with a handle 12, which projects through a slot 13 formed in the flange 8; and formed integral with the top of the disk 11, adjacent the edge thereof, is a series of lugs 14 having gradually inclined top faces.

Formed in the center of the disk 9 is a circular aperture 15, which coincides with the aperture 10 in the disk 9, and formed integral with said disk 11, adjacent the aperture 15, is a series of lugs 16, having inclined top faces, and which correspond in number with the lugs 14.

A circular block 17 occupies the aperture 4 in the block 3, the top surface of which block 17 is concave, as designated by 18; and formed integral with the lower end of said block is a stem 19, which occupies the apertures 10 and 15 in the disks 9 and 11; and the shoulder between the block 17 and stem 19 is notched, as designated by 20, in order to receive the lugs 16 of said disk 11.

Formed in the block 3, adjacent the aperture 4, is a vertically disposed slot 21, and formed integral with the lower end of the block 17 is a lug 22, which rides in said slot 21 to prevent said block from rotating when moving vertically.

The auxiliary molds or matrices 23 are made in segmental form, and of such size as to fit snugly in the depression 7, and formed in the top face of each auxiliary mold is a depression 24 conforming to the shape of the article being manufactured.

Each auxiliary mold 23 is rigidly held in position by a pair of screws 25, which pass through the under side of the block 3 and enter the under side of each auxiliary mold.

Formed through the centers of the auxiliary molds 23 are the vertically disposed apertures 26, and arranged to move vertically through said apertures are fingers 27, on the lower ends of which are formed integral enlarged stems 28, which operate through corresponding apertures 29 formed through the lower portion of the block 3, and the lower ends of said stems normally bearing on the inclined top faces of the lugs 14.

The upper mold frame comprises a circular block 30, which is adapted to move vertically to and from the lower mold frame in any suitable manner, and seated in the edge of said upper mold frame and depending therefrom is a series of pins 31, which enter the apertures 6 when the two parts of the mold frame are united.

Formed through the center of the upper mold frame is an aperture 32, and adapted to move vertically therethrough is a plunger 33, the lower end of which is convex in order to conform to the concave top surface 18 of the block 17; and formed in the exterior surface of the plunger 33 is an annular groove 34, from the upper end of which leads an air vent 35.

Formed through the plunger 33 is a horizontally arranged aperture 36, and leading therefrom downwardly to the bottom of said plunger is an aperture 37, the lower end of which is countersunk to form a valve seat.

A valve stem 38 is positioned in the aperture 37, the lower end of which stem carries a valve 39, which is adapted to close upon the valve seat at the lower end of the valve seat 37, and passing through the upper end of the stem 38, within the aperture 36, is a pin 40, which prevents the valve and valve stem from leaving the plunger 33.

Formed in the under side of the upper mold frame and concentric with the aperture 32 therethrough is an annular recess or depression 41, which is occupied by the upper auxiliary molds 42, which are made in segmental form and are counterparts of the lower auxiliary molds 23, and which upper auxiliary molds are rigidly held in position by screws 43 passing through the upper mold frame 30, and entering the tops of the said upper auxiliary molds 42.

When my improved mold is in use, the lower mold frame is moved through the way between the guide ribs 2 until in a position immediately beneath the upper mold frame, after which a proper quantity of molten glass is placed on the concave top 18 of the block 17, and the upper mold frame is now allowed to move downwardly onto the lower mold frame; and, in so doing, the pins 31 enter the apertures 6, thus insuring the correct positions of the upper and lower molds relative one another. The plunger 33 is now caused to descend and enter the aperture 32; and, as said plunger descends, the air between the lower end of the plunger and the molten glass escapes, through the aperture 37 to the aperture 36, from thence through the groove 34 and vent 35; and as soon as the valve 39 engages the molten glass, said valve will be forced upwardly to inclose the lower end of the aperture 37. The plunger moves downward to its limit of movement, which action forces the molten glass equally in all directions, thus filling the openings formed by the depressions in the coinciding faces of the auxiliary molds, and thus giving the desired shape to the articles being manufactured. The plunger 33 is now withdrawn by being moved upwardly in any suitable manner, during which upward movement air will enter the vent 35 and pass from thence downwardly through the groove 34, through the apertures 36 and 37, into the space between the pressed glass and the lower end of the plunger, thus destroying any partial vacuum that might occur in said chamber due to the withdrawal of the plunger.

The upper mold frame is elevated simultaneously with or immediately after the elevation of the plunger, after which the operator engages the handle 12 and shifts the same the length of the slot 13. This action causes all of the fingers 27 to be simultaneously elevated, owing to the engagement of the lower ends of the stems 28 upon the inclined top faces of the lugs 14, and at the same time the block 17 is elevated, owing to the engagement of the opposing inclined faces on the lugs 16 and notches 20; and this movement correspondingly elevates the central portion of the pressed glass which forms a web and unites all of the articles formed in the auxiliary molds. The finished articles, together with the web, are now engaged by a suitable tool, and lifted from the lower mold frame, after which the handle 12 is moved in a reverse direction to allow the block 17 and fingers 27 to move downwardly to their normal positions. Thus it will be seen a number of the bottle stoppers, or like articles, are formed at a single operation; and, if desired, any one or a number of the auxiliary molds can be removed and replaced with different auxiliary molds, thus making it possible to press or form different articles at the same time.

Small glass articles, such as bottle stoppers, and the like, can be very cheaply and quickly produced in a mold of my improved construction, and an operator in a very short time can readily and correctly gage the amount of molten glass which will be required to form the number of articles manufactured at a single operation.

By providing a mold with a number of detachable interchangeable auxiliary molds, any one of said molds can be readily removed and replaced upon becoming broken or worn while in use, and said auxiliary molds are more easily and cheaply manufactured than where a solid ring is made use of, having a number of depressions formed in its face.

I claim:—

1. A glass mold, constructed with a separable mold frame, a plurality of coinciding segmental auxiliary molds carried by each part of the separable mold frame, means whereby molten glass is simultaneously forced into all of the auxiliary molds, and means whereby the glass is simultaneously discharged from all of the auxiliary molds after having been pressed therein.

2. A glass mold, constructed with a separable mold frame, pairs of coinciding auxiliary molds detachably fixed in said frames, means whereby glass is simultaneously forced into all of the auxiliary molds, and means operating through the series of auxiliary molds carried by the lower half of the frame for elevating the glass after the same has been forced into the auxiliary molds and the upper half of the mold frame has been elevated.

3. A glass mold, comprising a separable mold frame, there being an opening in the upper portion of said frame, pairs of coinciding auxiliary molds detachably fixed in the upper frame, a plunger operating through the opening in the upper portion of the mold frame for simultaneously forcing molten glass into all of the auxiliary molds, and means whereby the molded glass is simultaneously discharged from all of the auxiliary molds.

4. A glass mold, constructed with a separable mold frame, a plurality of pairs of coinciding auxiliary molds arranged in the frame, a block arranged for vertical movement through the center of the lower portion of the mold frame, there being an opening in the center of the upper portion of the mold frame, ejecting fingers operating through the auxiliary molds carried by the lower portion of the mold frame, and means whereby the vertically moving block and the ejecting fingers are simultaneously elevated to discharge the molded glass.

5. A glass mold, constructed with a separable mold frame, a plurality of pairs of coinciding auxiliary molds arranged in the frame, a block arranged for vertical movement through the center of the lower portion of the mold frame, there being an opening in the center of the upper portion of the mold frame, ejecting fingers operating through the auxiliary molds carried by the lower portion of the mold frame, means whereby the vertically moving block and the ejecting fingers are simultaneously elevated to discharge the molded glass, and a plunger operating through the opening in the upper portion of the mold frame for simultaneously forcing molten glass into all of the auxiliary molds.

6. In a glass mold, a series of separable auxiliary molds arranged in pairs, means whereby said series of auxiliary molds are brought into juxtaposition, means whereby molten glass is simultaneously forced into all of the auxiliary molds, means whereby the upper series of auxiliary molds is elevated, and means whereby the glass forced into the auxiliary molds is elevated after the upper series of auxiliary molds has been elevated.

7. A glass mold, constructed with a separable mold frame, a plurality of pairs of coinciding auxiliary molds arranged in the frame, a block arranged for vertical movement through the center of the lower portion of the mold frame, there being an opening in the center of the upper portion of the mold frame, ejecting fingers operating through the auxiliary molds carried by the lower portion of the mold frame, and means arranged for operation in the lower portion of the separable mold frame for engaging the lower ends of the vertically moving block and ejecting fingers for elevating the same to discharge the molded glass from the auxiliary molds.

In testimony whereof, I have signed my name to this specification, in presence of two subscribing witnesses.

DALLAS D. HUGHEY.

Witnesses:
K. N. TAYLOR,
A. E. BASSETT.